(12) United States Patent
Persigehl

(10) Patent No.: US 12,718,410 B2
(45) Date of Patent: Aug. 25, 2026

(54) METHODS AND SYSTEMS FOR EYE-FIELD USER INTERACTIONS

(71) Applicant: Unity Technologies SF, San Francisco, CA (US)

(72) Inventor: Seth Phillip Persigehl, San Francisco, CA (US)

(73) Assignee: Unity Technologies SF, San Francisco, CA (US)

( * ) Notice: Subject to any disclaimer, the term of this patent is extended or adjusted under 35 U.S.C. 154(b) by 0 days.

(21) Appl. No.: 19/006,072

(22) Filed: Dec. 30, 2024

(65) Prior Publication Data

US 2026/0187840 A1 Jul. 2, 2026

(51) Int. Cl.
*G06T 7/80* (2017.01)
*G06F 3/01* (2006.01)

(52) U.S. Cl.
CPC ................ *G06T 7/80* (2017.01); *G06F 3/013* (2013.01); *G06T 2200/24* (2013.01); *G06T 2207/20081* (2013.01); *G06T 2207/30196* (2013.01); *G06T 2207/30204* (2013.01)

(58) Field of Classification Search
CPC .................. G06T 7/80; G06T 2200/24; G06T 2207/20081; G06T 2207/30196; G06T 2207/30204; G06F 3/013
See application file for complete search history.

(56) References Cited

U.S. PATENT DOCUMENTS 11,170,521 B1 * 11/2021 Ben Himane ........... G06T 19/20
2013/0028469 A1 * 1/2013 Lee .......................... G06T 7/73 382/103
2014/0380230 A1 12/2014 Venable et al.
2017/0115736 A1 * 4/2017 Patel ...................... G06F 3/013
(Continued)

FOREIGN PATENT DOCUMENTS

KR 20210085270 7/2021
WO WO-2020048441 A1 * 3/2020 ............... G06F 3/01

OTHER PUBLICATIONS

"Redo eye and hand setup on your Apple Vision Pro", Apple Inc., [Online]. Retrieved from the Internet: URL: https:support.apple.com guide apple-vision-pro redo-eye-and-hand-setup-tanf67b02683 visionos, (Accessed Nov. 25, 2024), 3 pgs.
(Continued)

*Primary Examiner* — Stephen G Sherman
(74) *Attorney, Agent, or Firm* — Schwegman Lundberg & Woessner, P.A.

(57) ABSTRACT

A method of implementing eye-field user interactions is disclosed. One or more light markers are displayed within an eye-field region of a head-mounted display device. The eye-field region is positioned within a configurable distance of a user's eyes and at a distance where both eyes of the user can focus on the one or more light markers. It is detected that the user is focusing on a first light marker of the one or more light markers. In response to detecting that the user is focusing on the first light marker, the first light marker is
(Continued)

moved in a confirmation pattern while. A virtual input event is triggered when the user's gaze follows the first light marker through the confirmation pattern with at least a threshold level of accuracy for a configurable duration.

21 Claims, 6 Drawing Sheets

(56) References Cited

U.S. PATENT DOCUMENTS

| | | | | |
|---|---|---|---|---|
| 2019/0147609 | A1* | 5/2019 | Lohry | G06V 20/64<br>382/154 |
| 2021/0042015 | A1 | 2/2021 | Ratcliff | |
| 2021/0097148 | A1* | 4/2021 | Bagschik | G06F 30/15 |
| 2021/0209364 | A1* | 7/2021 | Park | G06F 3/013 |
| 2022/0281317 | A1 | 9/2022 | Ahn et al. | |
| 2022/0334636 | A1 | 10/2022 | Miettinen et al. | |

OTHER PUBLICATIONS

"Eye control basics in Windows", Microsoft Support, [Online]. Retrieved from the Internet: URL: https: support.microsoft.com en-us windows eye-control-basics-in-windows-97d68837-b993-8462-1f9d-3c957117b1cf, (Accessed Nov. 25, 2024), 10 pgs.

Ghanayem, M, "Eye tracking in Mixed Reality Toolkit—MRTK2", Microsoft Learn, [Online]. Retrieved from the Internet: URL: https: learn.microsoft.com en-us windows mixed-reality mrtk-unity mrtk2 features input eye-tracking eye-tracking-main?view=mrtkunity-2022-05, (Jun. 29, 2022), 2 pgs.

Yau, Lawrence, "Building for UX: Connecting eye gaze to UI objects", Tobii, [Online]. Retrieved from the Internet: URL: https: url.us.m.mimecastprotect.com s 8sAoCgJ6QmCPZgBGfZCgH49auE?domain=tobii.com, (Accessed Nov. 25, 2024), 17 pgs.

"European Application Serial No. 25221035.6, Extended European Search Report mailed Apr. 29, 2026", 12 pages.

* cited by examiner

Figure 3:
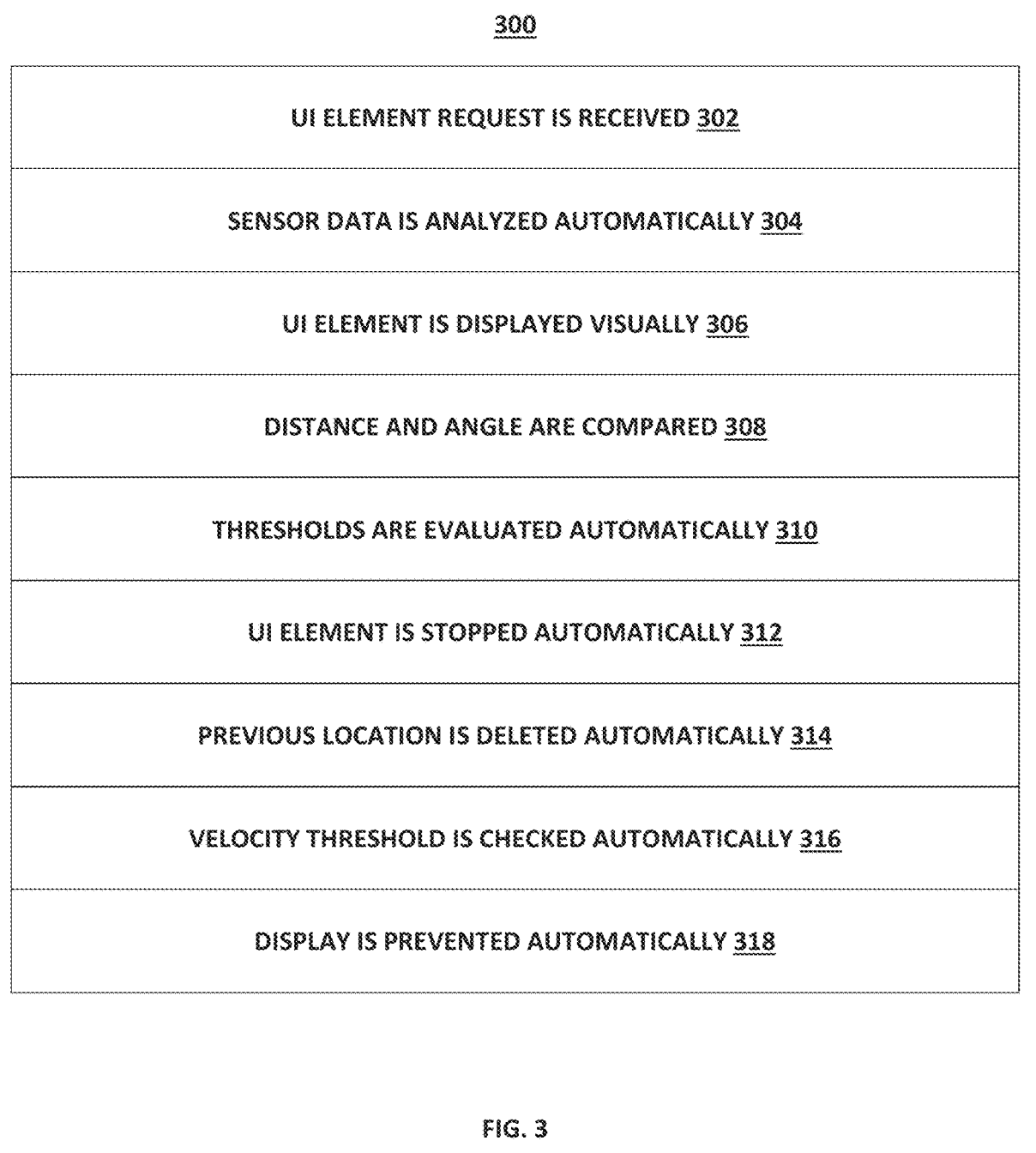

300

| UI ELEMENT REQUEST IS RECEIVED 302 |
| --- |
| SENSOR DATA IS ANALYZED AUTOMATICALLY 304 |
| UI ELEMENT IS DISPLAYED VISUALLY 306 |
| DISTANCE AND ANGLE ARE COMPARED 308 |
| THRESHOLDS ARE EVALUATED AUTOMATICALLY 310 |
| UI ELEMENT IS STOPPED AUTOMATICALLY 312 |
| PREVIOUS LOCATION IS DELETED AUTOMATICALLY 314 |
| VELOCITY THRESHOLD IS CHECKED AUTOMATICALLY 316 |
| DISPLAY IS PREVENTED AUTOMATICALLY 318 |

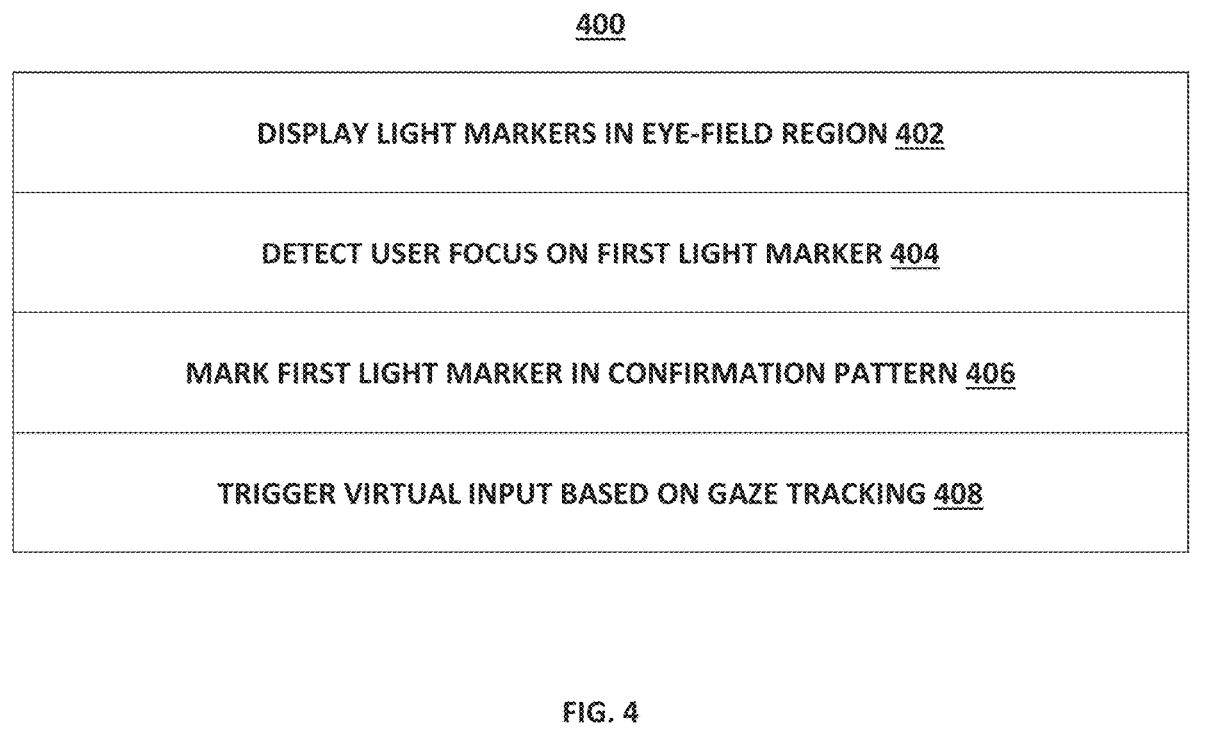

| DISPLAY LIGHT MARKERS IN EYE-FIELD REGION 402 |
|---|
| DETECT USER FOCUS ON FIRST LIGHT MARKER 404 |
| MARK FIRST LIGHT MARKER IN CONFIRMATION PATTERN 406 |
| TRIGGER VIRTUAL INPUT BASED ON GAZE TRACKING 408 |

FIG. 4

METHODS AND SYSTEMS FOR EYE-FIELD USER INTERACTIONS

TECHNICAL FIELD

The present invention generally relates to eye tracking-based user interaction systems in virtual and mixed reality environments, and, in one specific embodiment, to a system for detecting user intent through eye gaze tracking of small light markers positioned in a user's eye field.

BACKGROUND

Eye tracking technology has been used in virtual and mixed reality environments to enable user interactions. Traditional approaches have relied on either dwell time systems, where users must maintain gaze on a target for an extended period, or combination systems that require additional physical inputs, like button presses or gestures, to confirm selections. These conventional methods, while functional, introduce inherent latency in the interaction process or require additional physical actions that may not be ideal for all use cases.

BRIEF DESCRIPTION OF THE DRAWINGS

Features and advantages of the present invention will become apparent from the following detailed description, taken in combination with the appended drawings, in which:

FIG. 3 is flowchart illustrating an example method of implementing eye-field user interactions;

FIG. 4 is a flowchart illustrating an example method for implementing eye-field user interactions;

DETAILED DESCRIPTION

Figure 1:
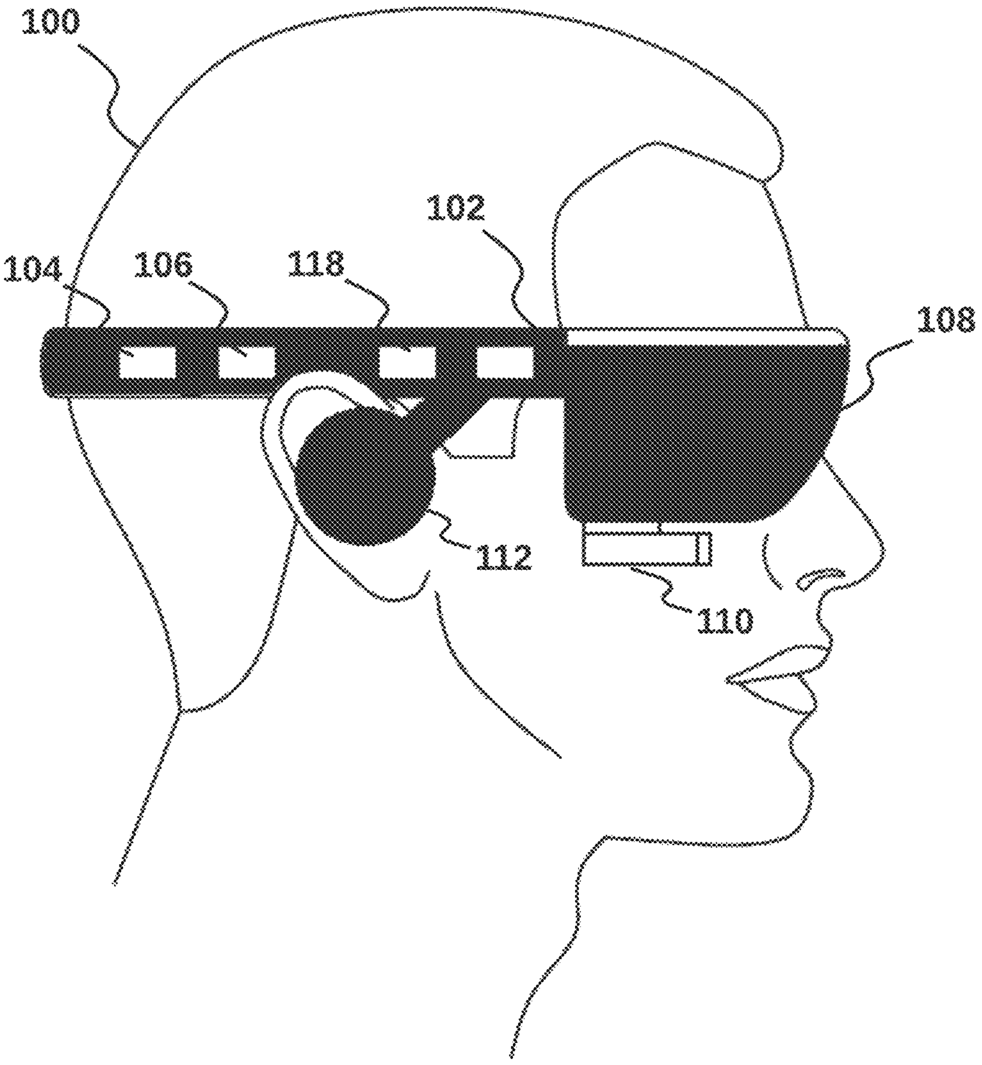
FIG. 1 is a schematic illustrating an example head mounted display.

The description that follows describes systems, methods, techniques, instruction sequences, and computing machine program products that constitute illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details.

Traditional eye tracking systems face a fundamental challenge with their reliance on extended dwell times, typically requiring users to maintain gaze on a target (e.g., for one to two seconds) to trigger actions. This introduces substantial latency that degrades the user experience and limits the technology's practical applications. Additionally, existing systems may require supplementary physical inputs such as finger taps or button presses to confirm selections, which restricts accessibility and usability in scenarios where users' hands were occupied or when physical input was impractical.

A technical limitation of conventional systems is their inability to reliably distinguish between intentional selections and incidental gaze intersections at typical interaction distances. When markers or interface elements are positioned at standard distances (e.g., at around 1 meter from the user), existing systems may misinterpret users looking at background objects as intended interactions.

The described embodiments provide a novel technical solution by, for example, positioning small light markers within the user's eye-field (e.g., within centimeters of the user's eyes where both eyes can still focus). This precise positioning creates an unprecedented signal-to-noise ratio for gaze detection, as there are typically no other objects competing for attention in this space.

In example embodiments, a light marker may include a shape (e.g., an orb or a sphere), a single point of light, or a set color that is displayed on one or more 2D stereoscopic displays and that appears in a fixed position in 3D space as perceived by a user.

While light markers may have a defined shape, unlike a traditional user interface elements such as pictograms or icons, light markers do not need to include iconography. Light markers are simpler and can therefore be made to appear much smaller to a user while still retaining their function.

For some applications, such as training new users or users with reduced eyesight, light markers may be configured to be made larger than normal or have icons added to them, but the icons are not required.

The described embodiments further advance the technology through innovative use of confirmation patterns rather than static dwell times. When user focus is detected on a marker, the system (e.g., the eye-field interaction system) initiates a dynamic movement pattern (e.g., by moving the marker, such as in a direction away from the user, including while optionally maintaining other markers in their original positions).

This approach consolidates the traditional dwell time into a motion vector, allowing for much faster interaction times, reducing the required confirmation period (e.g., from approximately one second to a quarter second) while maintaining high reliability.

In example embodiments, the system incorporates sophisticated machine-learning capabilities to continuously improve accuracy and/or reduce required interaction times. The ML model analyzes temporal sequences of gaze vectors rather than just instantaneous intersection points, learning to distinguish patterns that indicate deliberate user intent versus incidental gaze intersection. This enables dynamic adjustment of activation thresholds based on detected user behavior patterns, representing a significant advancement over traditional systems that rely solely on static geometric calculations.

The implementation is designed for maximum flexibility and efficiency, supporting both high-level application integration (e.g., through scripts, such as C# scripts) and low-level firmware implementation for enhanced performance.

In example embodiments, the system directly accesses the eye tracking cameras at the operating system level, or at an even lower level, such as the firmware level, to create a 3D model of each eye and determine precise eyeball orientation and pointing direction. This allows for faster processing of the gaze vectors compared to relying on higher-level APIs.

The implementation includes calibration routines that measure pixel error rates during an initial calibration phase where users focus on known reference points. These error measurements may be used to define precise confidence areas for gaze intersection detection at the hardware level. The operating system or firmware can also dynamically adjust these confidence areas based on data from the HMD's environmental sensors, such as illumination sensors.

Each of the lower-level implementation(s) may maintain the same core functionality as the application-level version, but with improved performance because it eliminates several layers of software abstraction. In example embodiments, this implementation is adapted for different hardware implementations to account for variations in lens distortions and/or other hardware-specific characteristics.

In example embodiments, the system includes advanced calibration capabilities that measure and/or account for camera imperfections, along with dynamic confidence area adjustments based on environmental conditions and/or head movement. The markers themselves can be programmed to represent various functions, similar to physical controller buttons, and can be remapped based on application requirements.

This technical solution not only addresses the core limitations of existing eye tracking interfaces but also enables new use cases, such as benefiting users with disabilities or situations where traditional physical inputs are impractical. The system's optional integration with an XR input system positions it to serve the growing market of VR/AR applications, while its minimal computational overhead and sophisticated error handling make it practical for widespread deployment.

In example embodiments, a system and method for eye-based user interactions in virtual and mixed reality environments that significantly reduces interaction latency compared to conventional dwell time approaches is disclosed.

In example embodiments, the system displays one or more small light markers (e.g., dots) positioned within the user's eye-field, which may be defined as being very close to the user's eyes but at a distance where both eyes can still focus (e.g., based on one or more configurable eye-field parameters). In example embodiments, the light markers don't require perfect focus, and can be activated when the user's eyes are not in focus (e.g., within a configurable focus threshold).

These dots can be colored to either stand out from or blend into the environment (e.g., depending on user preference and experience level).

In example embodiments, (e.g., during an idle state) one or more light dots are positioned in the user's eye-field, serving as potential interaction points.

In example embodiments, when the user focuses on a specific dot, the system detects this using eye tracking vectors from one or both eyes. The system achieves high confidence in user intent due to the dots' close proximity, as there are typically no other objects in the eye-field space.

In example embodiments, upon detecting user focus, the system moves the selected dot in a predetermined pattern, such as in a pattern that moves away from the user. The pattern can be a simple linear movement or one or more complex patterns, like spirals. The pattern can include motion within a plane at a fixed distance and/or the pattern can include changes in depth.

In example embodiments, the system tracks whether the user's gaze follows the moving dot. If the user maintains focus through the pattern with sufficient accuracy (e.g., above an 80% confidence threshold), the system triggers a virtual button press event.

In example embodiments, the computational impact is minimal, as the primary processing overhead comes from the existing eye-tracking camera feed analysis.

In example embodiments, the dots can be programmed to represent various functions, similar to physical controller buttons, and can be remapped based on the application's needs.

In example embodiments, the system is particularly useful for media applications, messaging, and/or scenarios where users need quick response capabilities while their hands are occupied.

In example embodiments, machine learning can be incorporated to improve the accuracy of intent detection by analyzing gaze patterns over time, potentially allowing for even shorter confirmation times.

In example embodiments, the model is trained on various eye movements and lens distortions to ensure robust performance across different hardware implementations.

In example embodiments, the system integrates with an XR package, such as Unity's XR package, as a virtual controller, allowing developers to easily map the dots to specific functions within their applications.

In example embodiments, this standardized interface works across various VR/AR platforms that support eye tracking, making it a versatile solution for hands-free interaction in virtual environments.

A method of implementing eye-field user interactions is disclosed. One or more light markers are displayed within an eye-field region of a head-mounted display device. The eye-field region is positioned within a configurable distance of a user's eyes and at a distance where both eyes of the user can focus on the one or more light markers. It is detected that the user is focusing on a first light marker of the one or more light markers. In response to detecting that the user is focusing on the first light marker, the first light marker is moved in a confirmation pattern (e.g., while maintaining other light markers in their original positions). A virtual input event is triggered when the user's gaze follows the first light marker through the confirmation pattern with at least a threshold level of accuracy (e.g., for a configurable duration).

Throughout the description herein, the term mixed reality or mixed reality environment (MR environment) should be understood to include all combined environments in the spectrum between reality and virtual reality including virtual reality, augmented reality, and augmented virtuality.

The present disclosure includes apparatuses that perform the operations or methods disclosed herein, including data processing systems that perform these operations or methods and computer readable media including instructions that, when executed by one or more processors of one or more data processing systems cause the one or more data processing systems to perform these operations or methods.

FIG. 1 is a diagram of an example head-mounted display (HMD) 102, worn by a user (or "wearer") 100. In the example embodiment, the user 100 (e.g., a game developer) experiences a VR environment or augmented reality (AR) environment while wearing the HMD 102. The HMD device 102 includes a transparent or semi-transparent visor (or "lens" or "lenses") 108 through which the wearer 100 views their surroundings (also herein referred to as "the real world"). In other embodiments, the HMD device 102 may include an opaque visor 108 which may obscure the wearer 100's view of the real world and on which a complete virtual environment is displayed.

In the example embodiment, the HMD 102 also includes a display device 118 that renders graphics (e.g., virtual objects) onto the visor 108. As such, the visor 108 acts as a "screen" or surface on which the output of the display device 118 appears, and through which the wearer 100 experiences virtual content. The display device 118 is driven or controlled by one or more graphical processing units (GPUs) 106. The GPU 106 processes aspects of graphical output that assists in speeding up rendering of output through the display device 118.

In the example embodiment, the HMD device 102 also includes a central processing unit (CPU) 104 that may execute some of the operations and methods described herein. The HMD device 102 also includes an audio device 112 (e.g., speakers) that is configured to present audio output to the wearer 100. While not separately shown, the HMD device 102 also includes wired or wireless network adapters (e.g., Wi-Fi, Bluetooth, cellular) that facilitate communication between the HMD and other computing devices described herein.

In some embodiments, the HMD device 102 includes a digital camera device 110. The digital camera device (or just "camera") 110 is a forward-facing video input device that is oriented so as to capture at least a portion of a field of view (FOV) of the wearer 100. In other words, the camera 110 captures or "sees" an angle of view of the real world based on the orientation of the HMD device 102 (e.g., similar to what the wearer 100 sees in the wearer 100's FOV when looking through the visor 108). The camera devices 110 may be configured to capture real-world digital video around the user 100 (e.g., a field of view, a peripheral view, or a 3600 view around the wearer 100). The camera devices 110 may be used to capture digital video of the real real-world environment around the user 100. In some embodiments, output from the digital camera device 110 may be projected onto the visor 108 (e.g., in opaque visor embodiments), and may also include additional virtual content (e.g., added to the camera output). In some embodiments there can also be a depth camera on the HMD 102.

In some embodiments, the HMD device 102 may include one or more sensors (not separately shown), or may be coupled in wired or wireless communication with the sensors. For example, the HMD 102 may include motion or position sensors configured to determine a position or orientation of the HMD 102. In some embodiments, the HMD device 102 may include a microphone for capturing audio input (e.g., spoken vocals of the user 100).

In some embodiments, the HMD 102 may be similar to virtual reality HMDs such as the Oculus Rift™, The HTC Vive™, The Playstation VR™, and the like. In some embodiments, the HMD 102 may be similar to augmented reality HMDs such as the Microsoft Hololens™ or Meta™ HMD. In some embodiments, the user 100 may hold one or more hand tracking devices ("handhelds") (not separately shown in FIG. 1) (e.g., one in each hand). The handhelds provide information about the absolute or relative position and orientation of a user's hands and, as such, are capable of capturing hand gesture information. The handhelds may be configured to operate directly with the HMD 102 (e.g., via wired or wireless communication). In some embodiments, the handhelds may be Oculus Touch™ hand controllers, HTC Vive™ hand trackers, or Playstation VR™ hand controllers. The handhelds may also include one or more buttons or joysticks built into the handheld. In other embodiments, the user 100 may wear one or more wearable hand tracking devices (e.g., motion tracking gloves, not shown), such as those made commercially available by Manus VR (Netherlands). In still other embodiments, hand motion of the user 100 may be tracked without, or in addition to, the handhelds or wearable hand tracking devices via a hand position sensor (not shown, e.g., using optical methods to track the position and orientation of the user's hands) such as, for example, those made commercially available by Leap Motion, Inc. (a California corporation). Such hand tracking devices (e.g., handhelds) track the position of one or more of the hands of the user during operation.

During operation, in the example embodiment, the HMD 102 is mounted on a head of the wearer 100, and over both eyes of the wearer 100, as shown in FIG. 1. The wearer 100 may be presented with a virtual environment which may be viewed and edited via the HMD 102 and handhelds as described herein.

In example embodiments, the eye-field interaction system is implemented through several components of the head-mounted display (HMD) 102 shown in FIG. 1. The display device 118 renders small light markers (dots) within centimeters of the user's eyes through the (e.g., transparent or semi-transparent) visor 108, positioning them in the user's eye-field where both eyes can still focus. The digital camera 110 provides eye tracking capabilities, capturing precise gaze vectors from each eye to enable high-confidence detection of when users focus on specific markers. The CPU 104 processes the eye tracking data in real-time to determine gaze intersection points and confidence levels, while also controlling the movement patterns of markers during confirmation sequences. The GPU 106 handles the rendering of the markers, ensuring they maintain proper positioning and visibility while executing movement patterns. In example embodiments, the audio device 112 may provide optional feedback during interactions.

In example embodiments, the firmware implementation leverages the HMD's hardware components shown in FIG. 1, including direct access to the digital camera 110 for eye tracking, the CPU 104 for real-time vector processing, and the display device 118 for rendering the light markers. By operating at the firmware level, the system can optimize the communication between these hardware components to reduce latency.

Figure 2:
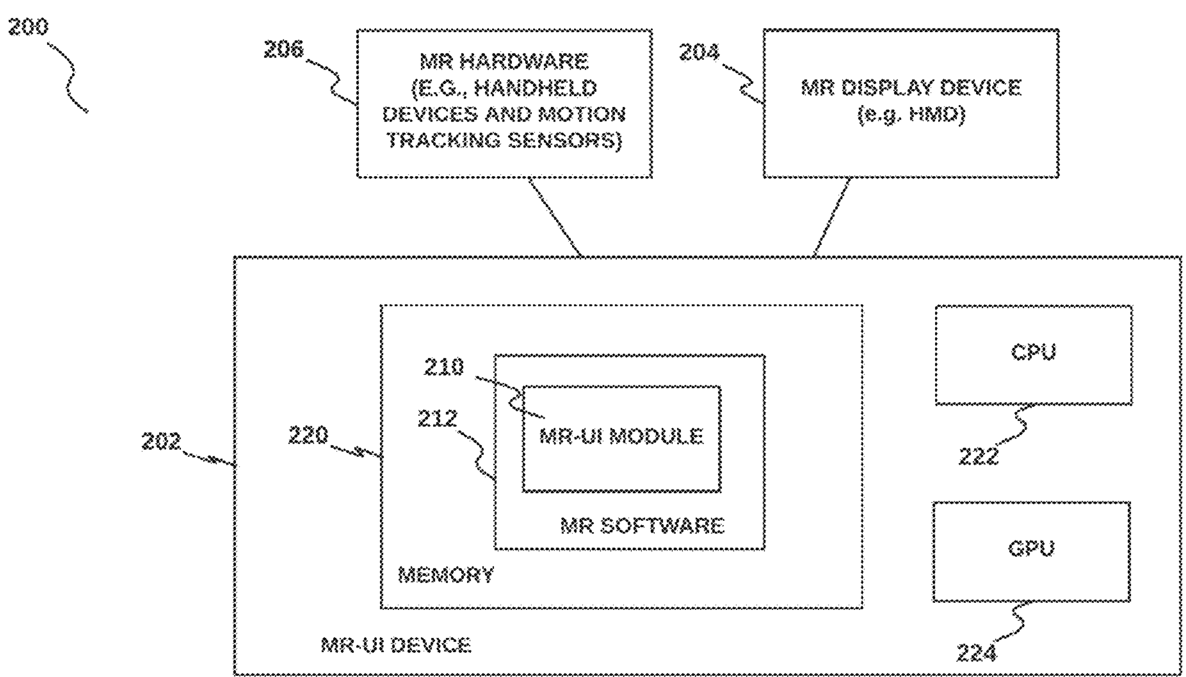
FIG. 2 is a schematic illustrating an example mixed reality-user interface (MR-UI) system.

FIG. 2 is a component diagram of a mixed reality user interface system 200 (or MR-UI system) that includes components similar to the HMD 102 and the handhelds discussed in relation to FIG. 1. In the example embodiment, the MR-UI system 200 includes a MR-UI device 202, a MR display device 204, and one or more MR input devices 206. In some embodiments, the MR display device 204 may be similar to the visor 108, and the MR input device(s) 206 may be similar to the handhelds or other tracking devices described above in reference to FIG. 1.

In the example embodiment, the MR-UI device 202 includes a memory 220, one or more CPUs 222, and one or more GPUs 224. In some embodiments, the CPU 222 may be similar to the CPU 104, the GPU 224 may be similar to the GPU 106, and the MR-UI device 202 may be at least a part of the HMD 102. In some embodiments, the MR-UI system 200 and the various associated hardware and software components described herein may provide AR content instead of, or in addition to, VR content (e.g., in a mixed reality (MR) environment). It should be understood that the systems and methods described herein may be performed with AR content and, as such, the scope of this disclosure covers both AR and VR applications.

In the example embodiment, MR-UI device 202 includes a MR engine 212 (e.g., mixed reality software), executed by the CPU 222 and/or GPU 224, that provides a MR environment through the MR display device 204 (e.g., to the user 100). The MR engine 212 includes a MR-UI module 210 that enables various aspects of mixed reality user interface actions for the user 100 within the MR environment as described herein. Throughout the description herein, the MR environment includes a coordinate system referred to as world coordinates. The MR-UI module 210 may be implemented within, or communicate with, a larger more generic MR software application such as the MR engine 212 (e.g., a mixed reality editing application).

The MR-UI module 210 and the MR engine 212 include computer-executable instructions residing in the memory 220 that are executed by the CPU 222 and optionally with the GPU 224 during operation. The MR engine 212 communicates with the MR display device 204 (e.g., the HMD 102) and also with other MR hardware such as the MR input device(s) 206 (e.g., motion capture devices such as the handhelds). The MR-UI module 210 may be integrated directly within the MR engine 212, or may be implemented as an external piece of software (e.g., a plugin).

In example embodiments, the system architecture shown in FIG. 2 illustrates how components may work together in the MR-UI system 200. The MR-UI Module 210, operating within the MR Software 212, contains the core logic for managing the eye-field interaction system. This includes displaying and controlling the light markers, processing eye tracking data from the cameras, detecting user focus on specific markers, implementing confirmation patterns, and/or triggering virtual button events when confirmations are successful. The Memory 220 stores essential configuration data including marker colors, positions, movement patterns, and/or mappings of markers to virtual button functions.

The CPU 222 and GPU 224 may work in concert to process the eye tracking vectors in real-time, calculate gaze intersection points, generate marker movement patterns, and/or maintain high-confidence thresholds for interaction detection. This architecture supports both high-level implementation (e.g., through C# scripts) and lower-level (e.g., firmware or operating system level) implementations for enhanced performance, with the computational impact remaining minimal as the primary processing overhead comes from existing eye-tracking camera feed analysis.

The eye-field interaction system can be implemented through an example method illustrated in FIG. 3, which shows a flowchart 300 of the operational steps.

At operation 302, a request to display a UI element (e.g., light marker or dot) is received on the HMD device.

The request to display the UI element in operation 302 can be triggered in one or more ways based on the system's implementation. When integrated as part of an XR input system, the request may be generated when an application developer maps specific functions to virtual buttons represented by the dots. For example, the request may be initiated when the application needs to display controls for media playback, messaging interactions, and/or quick confirmation messages.

In example embodiments, while a UI element can be shown then hidden based on context, it may also be left on persistently. This can be useful for system context items (e.g., "go home", "back", or "reset") as well as for user function shortcuts (e.g., "take a picture" or "toggle flashlight on/off"). This may be similar to buttons that have a configuration option to either show or hide system UI buttons, typically along the bottom of the display (e.g., Android buttons). Such buttons can be configured to show persistently, contextually, or based on a gesture.

The request can also originate from the application's need to provide actionable gesture input for head-up-displays (HUDs) or for interacting with objects in the mixed reality environment. The system may generate requests to display multiple dots simultaneously, with each dot mapped to different functions similar to physical controller buttons that can be reassigned depending on the application.

For accessibility use cases, the request may be triggered when the system detects that traditional input methods are unavailable or when the user has configured the system to prefer eye-based interactions. This may be particularly relevant for users who may have temporary or long-term limitations to physical motion.

The request may include one or more configuration parameters that specify, for example, the dot's color (e.g., which can be set for high contrast for new users or subtle/blended for experienced users), the dot's position within the eye-field, the mapping of the dot to specific virtual button functions, and/or the confirmation pattern to be used for that particular interaction.

At operation 304, the system may analyze sensor data from the HMD to determine the device's position, orientation, velocity, and/or the user's view frustum. In example embodiments, the position of the light markers may be determined regardless of the position or orientation of the HMD (e.g., based on where the user's eyes are looking).

In example embodiments, sensor data may be analyzed from the HMD device to determine positioning parameters that enable proper eye-field interaction. The system may use eye tracking data from one or more cameras to determine precise gaze vectors for each eye. The sensor analysis determines the HMD's position, orientation, velocity, and/or the user's view frustum. This sensor data analysis is useful for establishing the optimal positioning of the light markers within the user's eye-field.

In example embodiments, the system processes this sensor data to calculate intersection points between the two eye vectors with a defined confidence area to account for camera imperfections.

For optimal performance, the system may incorporate machine learning to analyze the gaze patterns over time, helping to refine the accuracy of position and orientation detection. This analysis may help ensure the light markers are positioned at a distance where both eyes can focus, which may be useful for the system's reliability. The sensor data analysis also helps prevent misinterpretation of user intent by ensuring the markers are positioned close enough to avoid confusion with background objects.

The polling of the operating system mentioned in operation 304 provides an alternative or supplementary method for obtaining this positioning data when direct sensor access is not optimal. This dual-path approach ensures robust tracking of the HMD's spatial parameters, which may be helpful for maintaining accurate eye-field interactions.

At operation 306, based on display style and/or position instructions, one or more UI elements are displayed through the HMD display device at a carefully controlled distance within the user's eye-field where both eyes can focus.

In example embodiments, the one or more UI elements are displayed on the HMD display device based on display style instructions and position instructions.

The display style instructions control parameters such as the dot's color and opacity, which can be configured for high contrast to assist new users or subtle/blended appearance for experienced users. The position instructions ensure the dots are placed within centimeters of the user's eyes in the eye-field, at a distance where both eyes can still focus.

In example embodiments, the color may be changed to reflect a notification from the program, such as changing from a default green to a notification red.

In example embodiments, opacity or intensity may be changed (e.g., such as a pulsing bright red to a faint red, repeating) to draw user attention.

The one or more UI elements are displayed through the transparent or semi-transparent visor of the HMD to be visible to the user in the mixed reality environment. The system carefully controls the positioning to maintain high confidence in gaze detection by ensuring the markers remain at an optimal distance that prevents confusion with background objects. This positioning allows the system to achieve a high signal-to-noise ratio when detecting user intent.

The display operation may take into account the previously analyzed sensor data regarding HMD position, orientation, and/or user's view frustum to ensure optimal placement of the UI elements. The system can display multiple dots simultaneously, with each dot mapped to different functions similar to physical controller buttons that can be reassigned depending on the application. These dots serve as potential interaction points that the user can activate through gaze tracking, enabling functions like media playback control, messaging interactions, or quick confirmation messages.

At operation 308, the HMD distance and/or the angle relative to predetermined thresholds are continuously monitored. This monitoring ensures optimal positioning of the light markers for reliable eye tracking and user comfort.

In example embodiments, distance and angle comparisons are performed to ensure optimal interaction conditions. The system compares the HMD distance to a predetermined threshold distance and compares the HMD angle with a threshold angle. This comparison may be useful for maintaining the high signal-to-noise ratio that makes the eye-field interaction system effective.

The distance threshold may be used to ensure the light markers remain within centimeters of the user's eyes, in the eye-field zone where both eyes can still focus. This close positioning may help prevent confusion between the markers and background objects that might be present at greater distances. For example, if a marker were presented at 1 meter from the user, there may be a high likelihood of the system misinterpreting a user looking at a cup of water at the same distance as looking at the marker.

The angle threshold comparison helps ensure that the user's head orientation allows for comfortable and accurate eye tracking. In example embodiments, the system relies on precise gaze vectors from each eye to determine user intent. The angle comparison helps maintain optimal conditions for the eye tracking cameras to capture accurate gaze data and for the system to calculate reliable intersection points between the two eye vectors.

These threshold comparisons work in conjunction with the system's ability to process eye tracking data in real-time, allowing for quick adjustments to maintain interaction accuracy while preventing eye strain and unintended activations. The thresholds can be configured based on the application's needs and user comfort requirements.

At operations, 310, it is determined whether the HMD distance exceeds the threshold distance or the angle exceeds the threshold angle.

In example embodiments, when either the HMD distance exceeds the distance threshold or the HMD angle exceeds the threshold angle, the system proceeds to operation 312 to stop displaying the UI element. In example embodiments, the eye-field interaction system requires precise positioning of light markers within centimeters of the user's eyes to maintain the high signal-to-noise ratio necessary for accurate gaze detection.

The thresholds evaluated in operation 310 can be configured based on application requirements and user comfort needs. If the evaluation determines that the thresholds have been exceeded, the system transitions to operations 312 and 314 to manage the UI elements and begin monitoring HMD velocity. This ensures the system maintains optimal interaction conditions before re-enabling the display of UI elements.

At operation 312 if the HMD exceeds the threshold distance or the angle exceeds the threshold angle, the system stops displaying the UI element. This helps prevent eye strain and maintains high confidence in gaze detection by ensuring the markers remain within the optimal eye-field distance.

This operation may be useful for maintaining the system's high signal-to-noise ratio by ensuring the light markers are only displayed when they can be reliably detected and tracked. In example embodiments, the system removes the visual marker to prevent potential eye strain and unreliable interactions that could occur if the markers remained visible outside their optimal positioning parameters.

The operation works in conjunction with the system's ability to process eye tracking data in real-time, allowing for immediate response when positioning conditions become suboptimal. This quick response helps maintain the system's reliability and user comfort by preventing situations where the user might attempt to interact with markers that are not in an ideal position for accurate gaze detection.

After stopping the display of the UI element, the system transitions to operation 314 where it begins monitoring HMD velocity to determine when conditions might become favorable again for displaying the markers. This creates a smooth transition between active and inactive states of the eye-field interaction system, ensuring that markers only reappear when the system can maintain its high confidence thresholds for gaze detection.

At operation 314, the system deletes or ignores any previous anchor location and begins monitoring the HMD velocity over time.

In example embodiments, this operation is triggered after the system has stopped displaying the UI element due to exceeded distance or angle thresholds. The deletion of the previous anchor location helps prevent any lingering reference points that could interfere with future interaction attempts.

The velocity monitoring aspect may help determine when conditions may become favorable again for displaying the UI elements. The system tracks the HMD's movement speed to ensure stable conditions for accurate eye tracking and reliable user interactions. This velocity data is used in the subsequent operation 316 to evaluate whether the HMD movement has stabilized enough to potentially resume displaying the UI elements.

The operation leverages the MR-UI system's motion tracking capabilities through the MR hardware components shown in FIG. 2, including motion sensors that can detect the position, orientation, and velocity of the HMD device. This monitoring process is essential for maintaining the high signal-to-noise ratio required for accurate eye tracking and gaze detection, as rapid head movements could compromise the system's ability to accurately track eye vectors.

In example embodiments, the HMD is aware of relative motion as well as absolute motion. For example, if a user is on a train or airplane, the absolute motion vector can be very high, while the local/relative motion vector can still be small enough to be enabled for user interaction.

In example embodiments, the motion detection threshold is able to be adjusted/toggled by the user. For example, a user that is frequently in situations where they are running or climbing (e.g., such as a public safety officer) may opt for a higher setting at the expense of accuracy.

This operation helps ensure that the eye-field interaction system maintains its reliability by only attempting to display UI elements when the user's head movement is sufficiently stable.

At operation 316, the system checks if the HMD velocity is below a threshold value. This velocity monitoring helps ensure stable conditions for eye tracking and marker display.

In example embodiments, operation 316 represents a velocity check that determines whether conditions are suitable for re-enabling the UI elements. The system evaluates if the HMD velocity has dropped below a predetermined threshold value. This velocity check is useful because rapid head movements could compromise the system's ability to accurately track eye vectors and maintain the high signal-to-noise ratio required for reliable gaze detection.

The velocity threshold serves as a stability indicator; for example, when the HMD movement slows sufficiently, it suggests the user has achieved a relatively stable head position suitable for eye tracking interactions. If the velocity remains above the threshold, the system follows the "NO" path to operation 318, continuing to refrain from displaying the UI elements.

This operation works in conjunction with the machine learning components that can analyze gaze patterns over time, helping to determine optimal conditions for re-enabling the UI elements. The velocity check helps ensure that when the system does resume displaying the light markers, it can maintain its ability to detect the precise intersection points between the two eye vectors with high confidence.

This operation is useful for maintaining the system's reliability and preventing unintended activations that could occur if UI elements were displayed during periods of significant head movement.

At operation 318, if the velocity remains above the threshold, the system refrains from displaying the UI element. This prevents attempted interactions during rapid head movements when accurate eye tracking might be compromised.

In example embodiments, this operation serves as a safeguard to prevent attempted interactions during periods of significant head movement when accurate eye tracking might be compromised. The operation works in conjunction with the machine learning components that can analyze gaze patterns over time, helping to ensure UI elements only appear when the system can maintain reliable tracking of eye vectors. This is useful for maintaining the high signal-to-noise ratio that makes the eye-field interaction system effective.

By refraining from displaying the UI elements during periods of high velocity, the system helps prevent unintended activations and maintains user comfort. This may be useful because the system relies on precise positioning of light markers within centimeters of the user's eyes, where both eyes can focus. The operation continues until the velocity drops below the threshold, at which point the system can resume normal operation through the feedback loop shown in FIG. 3.

This operation helps ensure that the eye-field interaction system maintains its reliability by only displaying UI elements when stable conditions exist for accurate gaze detection. In example embodiments, a fallback mode may be optionally engaged using larger UI elements and/or slower confirmation motions to increase the signal-to-noise ratio.

In example embodiments, the method leverages the MR-UI Module 210 within the MR Software 212, utilizing both CPU 222 and GPU 224 for processing eye tracking vectors and rendering the markers.

Optional machine learning components can be integrated to analyze gaze patterns over time, potentially reducing confirmation times while maintaining accuracy thresholds. The entire process operates with minimal computational overhead since the primary processing cost comes from the existing eye-tracking camera feed analysis.

In example embodiments, the system employs machine learning techniques to improve eye tracking accuracy and reduce required dwell times while maintaining high detection confidence. Specifically, the machine learning model analyzes historical gaze vector data over multiple time slices to identify patterns that indicate deliberate user intent versus unintentional gaze intersection.

The machine learning system is trained on datasets containing eye tracking data with labeled examples of both intentional selections and incidental gaze intersections. This allows the model to learn nuanced patterns in how users' eyes move when deliberately focusing on and following a target (e.g., a light marker or confirmation pattern) versus when their gaze happens to pass through the target area. By analyzing the temporal sequence of gaze vectors rather than just instantaneous intersection points, the system can achieve higher accuracy in distinguishing intentional selections. One or more models may be trained for detecting focus with a certain confidence and/or for detecting whether a gaze follows a confirmation pattern.

A technical improvement enabled by the machine learning approach is the ability to dynamically adjust activation thresholds based on detected user behavior patterns. Rather than using fixed geometric thresholds around the target point, the system learns optimal threshold values that maintain high detection confidence while minimizing required dwell time. This represents a technological advancement over traditional eye tracking systems that rely solely on static geometric calculations.

The machine learning model analyzes one or more features, such as temporal sequences of gaze vector intersections over multiple time slices; velocity and/or acceleration patterns in eye movements; correlation between eye movements and/or target motion during confirmation patterns; and/or historical accuracy rates for different types of activation patterns.

This allows the system to achieve a concrete improvement in eye tracking technology by reducing required dwell times while maintaining reliable detection of user intent. The machine learning system continues to adapt and improve its detection accuracy over time based on ongoing analysis of successful and unsuccessful activation attempts.

The implementation leverages the MR-UI system's existing eye tracking cameras and processing capabilities, with the machine learning model operating either at the application level or at a lower level for enhanced performance. The computational overhead is minimal since the model analyzes the same gaze vector data already being collected for basic eye tracking functionality.

This machine learning approach provides a technological solution to the specific problem of distinguishing intentional eye-based selections from incidental gaze intersections, representing an improvement to eye tracking computer interface technology that enables faster and more reliable interactions. The system demonstrates a practical application of machine learning to enhance the core functionality of the eye tracking interface rather than just implementing an abstract concept.

In example embodiments, a method of implementing eye-field user interactions is disclosed. One or more light markers are displayed within an eye-field region of a head-mounted display device. The eye-field region is positioned within a configurable distance of a user's eyes and at a distance where both eyes of the user can focus on the one or more light markers. It is detected (e.g., using one or more eye tracking cameras of the head-mounted display device) that the user is focusing on a first light marker of the one or more light markers (e.g., by determining intersection points between gaze vectors from each eye of the user). In response to detecting that the user is focusing on the first light marker, moving the first light marker in a confirmation pattern (e.g., while maintaining other light markers in their original positions). In example embodiments, the confirmation pattern comprises moving the first light marker away from the user. A virtual input event is triggered when the user's gaze follows the first light marker through the confirmation pattern with at least a threshold level of accuracy for a configurable duration (e.g., less than one second).

In example embodiments, the displaying of the one or more light markers comprises displaying the light markers with configurable visual properties including at least one of color and opacity, wherein the color and opacity are configurable between high contrast settings for new users and low contrast settings for experienced users.

In example embodiments, displaying of the one or more light markers comprises positioning the light markers at a distance from the user's eyes that is beyond a near point where both eyes can focus and closer than a distance where background objects could interfere with gaze detection.

In example embodiments, the displaying of the one or more light markers comprises displaying a variable number of markers with configurable positions, wherein each marker is mapped to a different function that can be reassigned based on an active application.

In example embodiments, the displaying of the one or more light markers comprises temporarily disabling display of the markers when an unknown object is detected within the eye-field region until the object is cleared.

In example embodiments, the detecting that the user is focusing on the first light marker comprises generating a first gaze vector for a first eye of the user and a second gaze vector for a second eye of the user based on eye tracking camera data; calculating an intersection point between the first and second gaze vectors within a confidence area, wherein the confidence area accounts for camera imperfections; and/or determining that the intersection point intersects with the first light marker within the confidence area.

In example embodiments, the calculating of the intersection point comprises using a mathematical formula to find intersect points between the two gaze vectors and/or defining the confidence area based on tracking camera precision capabilities.

In example embodiments, the generating of the gaze vectors comprises creating a 3D model of each eye; determining an orientation and pointing direction of each eyeball based on the 3D model; and/or generating the gaze vectors based on the determined orientations and pointing directions.

In example embodiments, machine learning is applied to analyze the gaze vectors over multiple time slices to increase accuracy of intersection point detection and one or more activation thresholds are adjusted based on the machine learning analysis (e.g., to decrease required dwell time while maintaining detection confidence).

In example embodiments, the calculating the intersection point comprises calibrating the eye tracking cameras (e.g., by measuring pixel error rates during a calibration phase where the user focuses on known reference points and/or defining the confidence area based on the measured pixel error rates).

In example embodiments, the defining of the confidence area comprises determining a minimum confidence area size based on the measured pixel error rates that maintains a target signal-to-noise ratio for gaze detection and/or adjusting the confidence area size based on environmental lighting conditions detected by illumination sensors of the head-mounted display device.

In example embodiments, applying machine learning to analyze historical intersection point detection accuracy data to dynamically adjust the confidence area size while maintaining the target signal-to-noise ratio and/or decreasing required dwell time as intersection point detection accuracy improves.

In example embodiments, the calculating of the intersection point comprises filtering out intersection points that occur when unknown objects are detected within the eye-field region and/or temporarily expanding the confidence area size when head movement velocity exceeds a threshold value.

In example embodiments, the system calculates the intersection points between two gaze vectors (e.g., one from each eye) by finding where the vectors converge in 3D space. This may involve creating a 3D model of each eye and determining the orientation and pointing direction of each eyeball.

In example embodiments, the system accounts for camera imperfections by establishing a confidence area around the calculated intersection point. The size of this confidence area may be determined by pixel error rates measured during calibration when users focus on known reference points, environmental lighting conditions detected by the HMD's illumination sensors, and/or head movement velocity thresholds.

In example embodiments, the machine learning model analyzes temporal sequences of intersection points over multiple time slices to improve accuracy. This may involve weighting corresponding data points by their effect sizes, using multiplication to calculate weighted values, and/or using addition to sum the weighted values.

In example embodiments, at lower levels (e.g., the firmware or operating system level), the system performs direct vector calculations using the 3D eye models to determine precise gaze intersection points with minimal latency. This may involve real-time processing of the eye tracking vectors and maintaining high-confidence thresholds for interaction detection.

This approach consolidates traditional dwell time into a motion vector instead of a time vector, allowing for much faster interaction times while maintaining accuracy.

In example embodiments, a lower level implementation (e.g., a firmware implementation) creates a 3D model of each eye by directly accessing the eye tracking cameras, allowing the system to determine precise eyeball orientation and pointing direction with minimal latency. The system processes this raw camera data to calculate intersection points between the two eye vectors, establishing confidence areas that account for camera imperfections.

In example embodiments, the machine learning model analyzes temporal sequences of gaze vectors over multiple time slices, learning to distinguish patterns that indicate deliberate user intent versus incidental gaze intersection. The model is trained on labeled datasets containing examples of both intentional selections and accidental gaze intersections. This allows the system to dynamically adjust activation thresholds based on detected user behavior patterns while maintaining high detection confidence.

In example embodiments, the system includes calibration routines that measure pixel error rates during an initial phase where users focus on known reference points. These error measurements define precise confidence areas for gaze intersection detection at the hardware level. The confidence areas are dynamically adjusted based on environmental lighting conditions from the HMD's illumination sensors, head movement velocity thresholds, and/or historical accuracy rates for different activation patterns.

In example embodiments, the implementation optimizes communication between HMD components by direct firmware access to eye tracking cameras, real-time vector processing on the CPU, hardware-level confidence area calculations, and/or dynamic threshold adjustments.

This technical solution enables the system to reduce required dwell times while maintaining reliable detection of user intent. The machine learning system continues to adapt and improve its detection accuracy over time based on ongoing analysis of successful and unsuccessful activation attempts.

FIG. 4 is a flowchart illustrating a method 400 for implementing eye-field user interactions in accordance with some embodiments. The method may be performed by the MR-UI system 200 described above.

At operation 402, one or more light markers are displayed within an eye-field region of a head-mounted display device. The eye-field region is positioned within a configurable distance of a user's eyes and at a distance where both eyes of the user can focus on the one or more light markers. The light markers may be displayed with configurable visual properties including color and opacity that can be set between high contrast settings for new users and low contrast settings for experienced users.

At operation 404, the system detects that the user is focusing on a first light marker of the one or more light markers. This detection may be performed using one or more eye tracking cameras of the head-mounted display device by determining intersection points between gaze vectors from each eye of the user. The system may generate a first gaze vector for a first eye of the user and a second gaze vector for a second eye of the user based on eye tracking camera data, calculate an intersection point between the first and second gaze vectors within a confidence area that accounts for camera imperfections, and determine that the intersection point intersects with the first light marker within the confidence area.

At operation 406, in response to detecting that the user is focusing on the first light marker, the system moves the first light marker in a confirmation pattern (e.g., while maintaining other light markers in their original positions). The confirmation pattern may comprise moving the first light marker away from the user in a linear path or in more complex patterns like spirals.

At operation 408, the system triggers a virtual input event based on determining that the user's gaze follows the first light marker through the confirmation pattern with at least a threshold level of accuracy (e.g., for a configurable duration). The configurable duration may be less than one second, representing a significant improvement over traditional dwell time systems. The threshold level of accuracy may be dynamically adjusted based on machine learning analysis of historical gaze tracking data while maintaining high detection confidence.

This method provides an efficient and reliable way to implement eye-based interactions in virtual and mixed reality environments by using small light markers positioned in the user's eye-field combined with confirmation patterns, enabling faster interaction times compared to conventional dwell-based approaches.

Figure 5:
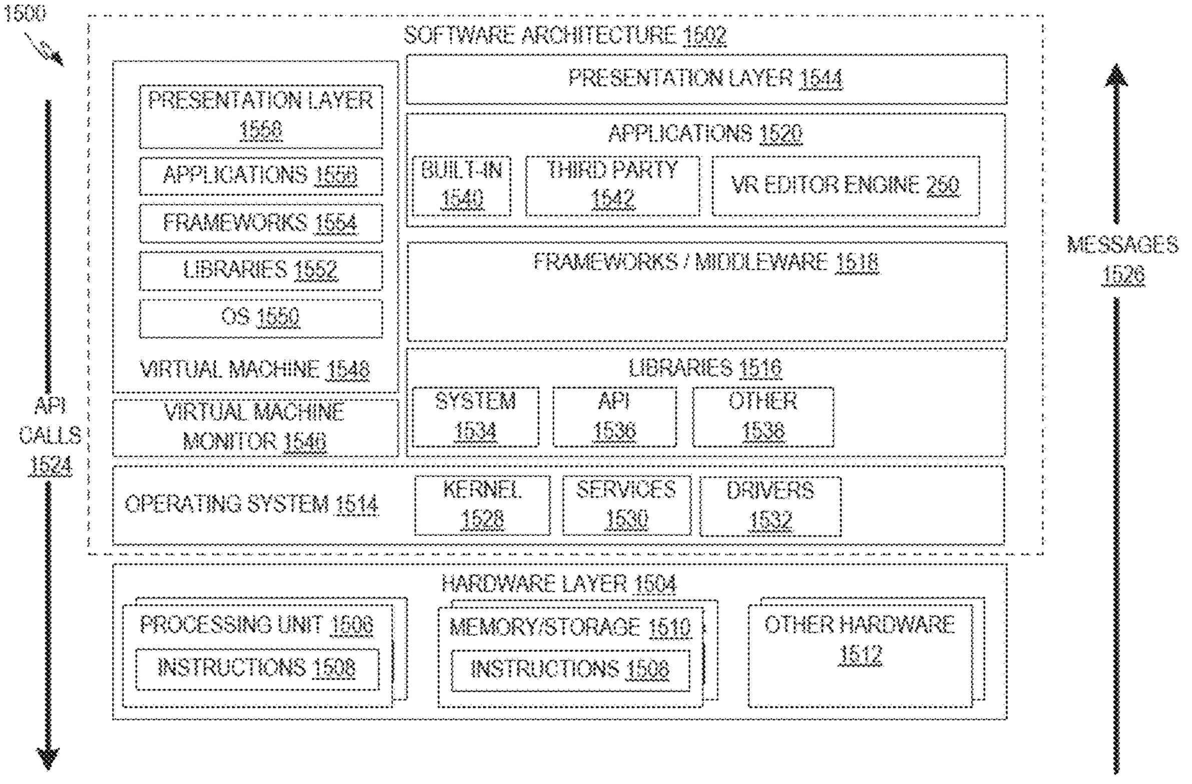
FIG. 5 is a block diagram illustrating an example software architecture, which may be used in conjunction with various hardware architectures herein described.

FIG. 5 is a block diagram 1500 illustrating a representative software architecture 1502, which may be used in conjunction with various hardware architectures described herein to provide the MR tools described herein. FIG. 5 is merely a non-limiting example of a software architecture and it will be appreciated that many other architectures may be implemented to facilitate the functionality described herein. The software architecture 1502 may be executing on hardware such as machine 1600 of FIG. 6 that includes, among other things, processors 1610, memory 1630, and I/O components 1650. A representative hardware layer 1504 is illustrated and can represent, for example, the machine 1600 of FIG. 6. The representative hardware layer 1504 comprises one or more processing units 1506 having associated executable instructions 1508. Executable instructions 1508 represent the executable instructions of the software architecture 1502, including implementation of the methods, modules and so forth described herein. Hardware layer 1504 also includes memory or storage modules 1510, which also have executable instructions 1508. Hardware layer 1504 may also comprise other hardware as indicated by 1512 which represents any other hardware of the hardware layer 1504, such as the other hardware illustrated as part of machine 1600.

In the example architecture of FIG. 5, the software 1502 may be conceptualized as a stack of layers where each layer provides particular functionality. For example, the software 1502 may include layers such as an operating system 1514, libraries 1516, frameworks/middleware 1518, applications 1520 and presentation layer 1544. Operationally, the applications 1520 or other components within the layers may invoke application programming interface (API) calls 1524 through the software stack and receive a response, returned values, and so forth illustrated as messages 1526 in response to the API calls 1524. The layers illustrated are representative in nature and not all software architectures have all layers. For example, some mobile or special purpose operating systems may not provide a frameworks/middleware layer 1518, while others may provide such a layer. Other software architectures may include additional or different layers.

The operating system 1514 may manage hardware resources and provide common services. The operating system 1514 may include, for example, a kernel 1528, services 1530, and drivers 1532. The kernel 1528 may act as an abstraction layer between the hardware and the other software layers. For example, the kernel 1528 may be responsible for memory management, processor management (e.g., scheduling), component management, networking, security settings, and so on. The services 1530 may provide other common services for the other software layers. The drivers 1532 may be responsible for controlling or interfacing with the underlying hardware. For instance, the drivers 1532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1516 may provide a common infrastructure that may be utilized by the applications 1520 or other components or layers. The libraries 1516 typically provide functionality that allows other software modules to perform tasks in an easier fashion than to interface directly with the underlying operating system 1514 functionality (e.g., kernel 1528, services 1530 or drivers 1532). The libraries 1516 may include system 1534 libraries (e.g., C standard library) that may provide functions such as memory allocation functions, string manipulation functions, mathematic functions, and the like. In addition, the libraries 1516 may include API libraries 1536 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1516 may also include a wide variety of other libraries 1538 to provide many other APIs to the applications 1520 and other software components/modules.

The frameworks 1518 (also sometimes referred to as middleware) may provide a higher-level common infrastructure that may be utilized by the applications 1520 or other software components/modules. For example, the frameworks 1518 may provide various graphic user interface (GUI) functions, high-level resource management, high-level location services, and so forth. The frameworks 1518 may provide a broad spectrum of other APIs that may be utilized by the applications 1520 or other software components/modules, some of which may be specific to a particular operating system or platform.

The applications 1520 includes built-in applications 1540 or third party applications 1542. Examples of representative built-in applications 1540 may include, but are not limited to, a contacts application, a browser application, a book reader application, a location application, a media application, a messaging application, a VR engine 1401, or a game application. Third party applications 1542 may include any of the built in applications as well as a broad assortment of other applications. In a specific example, the third party application 1542 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1542 may invoke the API calls 1524 provided by the mobile operating system such as operating system 1514 to facilitate functionality described herein.

The applications 1520 may utilize built in operating system functions (e.g., kernel 1528, services 1530 or drivers 1532), libraries (e.g., system 1534, APIs 1536, and other libraries 1538), frameworks/middleware 1518 to create user interfaces to interact with users of the system. Alternatively, or additionally, in some systems interactions with a user may occur through a presentation layer, such as presentation layer 1544. In these systems, the application/module "logic" can be separated from the aspects of the application/module that interact with a user.

Some software architectures utilize virtual machines. In the example of FIG. 5, this is illustrated by virtual machine 1548. A virtual machine creates a software environment where applications/modules can execute as if they were executing on a hardware machine. A virtual machine is hosted by a host operating system (operating system 1514 in FIG. 5) and typically, although not always, has a virtual machine monitor 1546, which manages the operation of the virtual machine as well as the interface with the host operating system (i.e., operating system 1514). A software architecture executes within the virtual machine such as an operating system 1550, libraries 1552, frameworks/middleware 1554, applications 1556 or presentation layer 1558. These layers of software architecture executing within the virtual machine 1548 can be the same as corresponding layers previously described or may be different.

In the example embodiment, the VR engine 1401 operates as an application in the applications 1520 layer. However, in some embodiments, the VR engine 1401 may operate in other software layers, or in multiple software layers (e.g., framework 1518 and application 1520), or in any architecture that enables the systems and methods as described herein. The VR engine 1401 may be similar to the VR engine 112.

Figure 6:
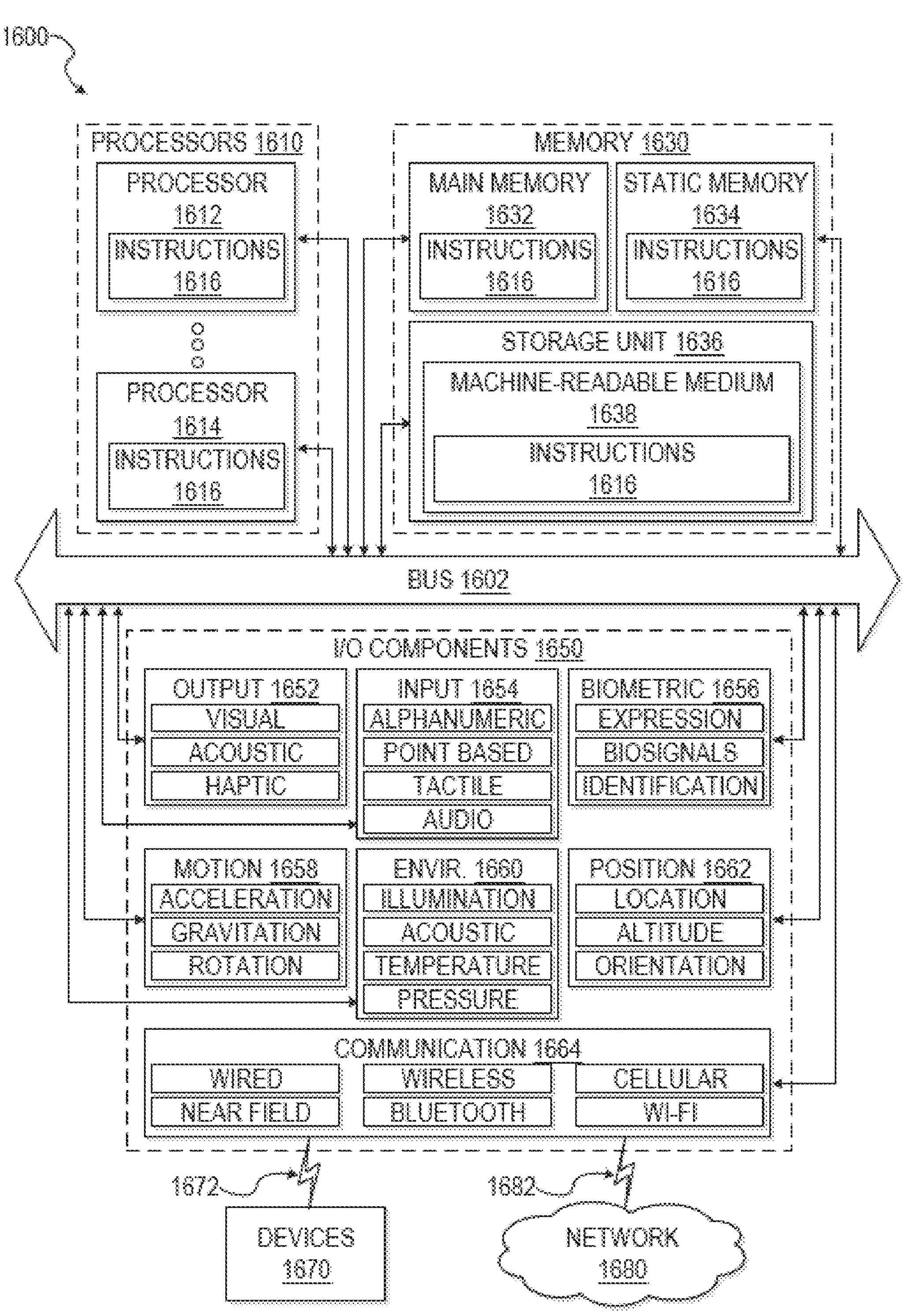
FIG. 6 is a block diagram illustrating example components of a machine that is configured to read instructions (e.g., from a machine-readable storage medium) and perform any one or more of the operations or methodologies discussed herein.

FIG. 6 is a block diagram illustrating components of a machine 1600, according to some example embodiments, able to read instructions from a machine-readable medium 1638 (e.g., a machine-readable storage medium) and perform any one or more of the VR methodologies discussed herein. Specifically, FIG. 6 shows a diagrammatic representation of the machine 1600 in the example form of a computer system, within which instructions 1616 (e.g., software, a program, an application, an applet, an app, or other executable code) for causing the machine 1600 to perform any one or more of the methodologies discussed herein may be executed. For example, the instructions may cause the machine to execute any of the operations described herein. The instructions transform the general, non-programmed machine into a particular machine programmed to carry out the described and illustrated functions in the manner described. In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1616, sequentially or otherwise, that specify actions to be taken by machine 1600. Further, while only a single machine 1600 is illustrated, the term "machine" shall also be taken to include a collection of machines 1600 that individually or jointly execute the instructions 1616 to perform any one or more of the methodologies discussed herein.

The machine 1600 may include processors 1610, memory 1630, and I/O components 1650, which may be configured to communicate with each other such as via a bus 1602. In an example embodiment, the processors 1610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1612 and processor 1614 that may execute instructions 1616. The term "processor" is intended to include multi-core processor that may comprise two or more independent processors (sometimes referred to as "cores") that may execute instructions contemporaneously. Although FIG. 6 shows multiple processors, the machine 1600 may include a single processor with a single core, a single processor with multiple cores (e.g., a multi-core process), multiple processors with a single core, multiple processors with multiples cores, or any combination thereof.

The memory/storage 1630 may include a memory 1632, such as a main memory, or other memory storage, and a storage unit 1636, both accessible to the processors 1610 such as via the bus 1602. The storage unit 1636 and memory 1632 store the instructions 1616 embodying any one or more of the methodologies or functions described herein. The instructions 1616 may also reside, completely or partially, within the memory 1632, within the storage unit 1636, within at least one of the processors 1610 (e.g., within the processor's cache memory), or any suitable combination thereof, during execution thereof by the machine 1600. Accordingly, the memory 1632, the storage unit 1636, and the memory of processors 1610 are examples of machine-readable media.

As used herein, "machine-readable medium" means a device able to store instructions and data temporarily or permanently and may include, but is not be limited to, random-access memory (RAN), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 1616. The term "machine-readable medium" shall also be taken to include any medium, or combination of multiple media, that is capable of storing instructions (e.g., instructions 1616) for execution by a machine (e.g., machine 1600), such that the instructions, when executed by one or more processors of the machine 1600 (e.g., processors 1610), cause the machine 1600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes transitory signals per se.

The I/O components 1650 may include a wide variety of components to receive input, provide output, produce output, transmit information, exchange information, capture measurements, and so on. The specific I/O components 1650 that are included in a particular machine will depend on the type of machine. For example, portable machines such as mobile phones will likely include a touch input device or other such input mechanisms, while a headless server machine will likely not include such a touch input device. It will be appreciated that the I/O components 1650 may include many other components that are not shown in FIG. 6. The I/O components 1650 are grouped according to functionality merely for simplifying the following discussion and the grouping is in no way limiting. In various example embodiments, the I/O components 1650 may include output components 1652 and input components 1654. The output components 1652 may include visual components (e.g., displays such as a plasma display panel (PDP), a light emitting diode (LED) display, a liquid crystal display (LCD), a projector, a cathode ray tube (CRT), or wearable devices such as head-mounted display (HMD) devices), acoustic components (e.g., speakers), haptic components (e.g., a vibratory motor, resistance mechanisms), other signal generators, and so forth. The input components 1654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), motion-sensing input components (e.g., hand controllers), audio input components (e.g., a microphone), and the like.

In further example embodiments, the I/O components 1650 may include biometric components 1656, motion components 1658, environmental components 1660, or position components 1662 among a wide array of other components. For example, the biometric components 1656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1658 may include acceleration sensor components (e.g., accelerometer), gravitation sensor components, rotation sensor components (e.g., gyroscope), position-sensing components, and so forth. The environmental components 1660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1650 may include communication components 1664 operable to couple the machine 1600 to a network 1680 or devices 1670 via coupling 1682 and coupling 1672 respectively. For example, the communication components 1664 may include a network interface component or other suitable device to interface with the network 1680. In further examples, communication components 1664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1670 may be another machine or any of a wide variety of peripheral devices (e.g., a peripheral device coupled via a Universal Serial Bus (USB)).

In various example embodiments, one or more portions of the network 1680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1680 or a portion of the network 1680 may include a wireless or cellular network and the coupling 1682 may be a Code Division Multiple Access (CDMA) connection, a Global System for Mobile communications (GSM) connection, or other type of cellular or wireless coupling. In this example, the coupling 1682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1616 may be transmitted or received over the network 1680 using a transmission medium via a network interface device (e.g., a network interface component included in the communication components 1664) and utilizing any one of a number of well-known transfer protocols (e.g., hypertext transfer protocol (HTTP)). Similarly, the instructions 1616 may be transmitted or received using a transmission medium via the coupling 1672 (e.g., a peer-to-peer coupling) to devices 1670. The term "transmission medium" shall be taken to include any intangible medium that is capable of storing, encoding, or carrying instructions 1616 for execution by the machine 1600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A non-transitory computer-readable storage medium storing a set of instructions that, when executed by one or more computer processors, causes the one or more computer processors to perform operations, the operations comprising:

displaying one or more light markers within an eye-field region of a head-mounted display device, the eye-field region positioned within a configurable distance of eyes of a user and at a distance where the eyes of the user can focus on the one or more light markers;

detecting that the user is focusing on a first light marker of the one or more light markers;

in response to detecting that the user is focusing on the first light marker, moving the first light marker in a predetermined confirmation pattern; and triggering a virtual input event based on a determination that gaze of the user follows the first light marker through the predetermined confirmation pattern with at least a threshold level of accuracy.

2. The non-transitory computer-readable storage medium of claim 1, wherein the predetermined confirmation pattern comprises changing a depth of display of the one or more light markers.

3. The non-transitory computer-readable storage medium of claim 1, wherein the displaying of the one or more light markers comprises displaying the one or more light markers with configurable visual properties including color or opacity, wherein the color or the opacity is configurable between high contrast settings for new users and low contrast settings for experienced users.

4. The non-transitory computer-readable storage medium of claim 1, wherein the displaying of the one or more light markers comprises positioning the one or more light markers at a distance from the eyes of the user that is beyond a near point where the eyes of the user can focus and closer than a distance where a background object could interfere with gaze detection.

5. The non-transitory computer-readable storage medium of claim 1, wherein the displaying of the one or more light markers comprises displaying a variable number of the one or more light markers with configurable positions, wherein each marker of the variable number is mapped to a different function that is configurable based on an active application.

6. The non-transitory computer-readable storage medium of claim 1, wherein the displaying of the one or more light markers comprises temporarily disabling display of at least one of the one or more light markers when an unknown object is detected within the eye-field region until the unknown object exits the eye-field region.

7. The non-transitory computer-readable storage medium of claim 1, wherein the detecting that the user is focusing on the first light marker comprises:

generating a first gaze vector for a first eye of the user and a second gaze vector for a second eye of the user;

calculating an intersection point between the first gaze vector and the second gaze vector within a confidence area; and determining that the intersection point intersects with the first light marker within the confidence area.

8. The non-transitory computer-readable storage medium of claim 7, wherein the calculating of the intersection point comprises using a mathematical formula to find one or more intersections between the first gaze vector and the second gaze vector and defining the confidence area based on tracking camera precision capabilities.

9. The non-transitory computer-readable storage medium of claim 7, wherein the generating of the first gaze vector and the second gaze vector comprises:

creating a 3D model of the eyes of the user;

determining an orientation and pointing direction of each the eyes based on the 3D model; and generating the first gaze vector and the second gaze vector based on the determined orientation and pointing direction.

10. The non-transitory computer-readable storage medium of claim 7, the operations further comprising applying machine learning to analyze the first gaze vector and the second gaze vector over a plurality of time slices to increase accuracy of intersection point detection, and wherein one or more activation thresholds are adjusted based on the applying of the machine learning.

11. The non-transitory computer-readable storage medium of claim 7, wherein the calculating of the intersection point comprises:

calibrating one or more eye tracking cameras by measuring pixel error rates during a calibration phase where the user focuses on known reference points; and defining the confidence area based on the measured pixel error rates.

12. The non-transitory computer-readable storage medium of claim 11, wherein the defining of the confidence area comprises:

determining a minimum confidence area size based on the measured pixel error rates that maintains a target signal-to-noise ratio for gaze detection; and adjusting the confidence area based on environmental lighting conditions detected by illumination sensors of the head-mounted display device.

13. The non-transitory computer-readable storage medium of claim 7, the operations further comprising applying machine learning to analyze historical intersection point detection accuracy data to dynamically adjust a size of the confidence area while maintaining a target signal-to-noise ratio and decreasing required dwell time as intersection point detection accuracy improves.

14. The non-transitory computer-readable storage medium of claim 2, wherein the calculating of the intersection point comprises expanding a size of the confidence area when head movement velocity exceeds a threshold value.

15. The non-transitory computer-readable storage medium of claim 7, the operations further comprising accounting for camera imperfections by establishing a confidence area around the calculated intersection point.

16. The non-transitory computer-readable storage medium of claim 7, the operations further comprising training a machine learning model to analyze temporal sequences of intersection points over a plurality of time slices to improve accuracy.

17. The non-transitory computer-readable storage medium of claim 16, wherein the training includes using labeled datasets containing examples of both intentional selections and accidental gaze intersections to allow for dynamic adjustment of activation thresholds based on detected user behavior patterns while maintaining high detection confidence.

18. The non-transitory computer-readable storage medium of claim 7, further comprising directing vector calculations at a firmware level using a 3D model of each of the eyes to determine precise gaze intersection points with minimal latency.

19. The non-transitory computer-readable storage medium of claim 18, further comprising creating the 3D model of each of the eyes by directly accessing one or more eye tracking cameras to determine precise eyeball orientation and pointing direction with minimal latency.

20. A system comprising:

one or more computer processors;

one or more computer memories; and a set of instructions stored in the one or more computer memories, the set of instructions configuring the one or more computer processors to perform operations, the operations comprising:

displaying one or more light markers within an eye-field region of a head-mounted display device, the eye-field region positioned within a configurable distance of eyes of a user and at a distance where the eyes of the user can focus on the one or more light markers;

detecting that the user is focusing on a first light marker of the one or more light markers;

in response to detecting that the user is focusing on the first light marker, moving the first light marker in a predetermined confirmation pattern; and triggering a virtual input event based on a determination that gaze of the user follows the first light marker through the predetermined confirmation pattern with at least a threshold level of accuracy.

21. A method comprising:

displaying one or more light markers within an eye-field region of a head-mounted display device, the eye-field region positioned within a configurable distance of eyes of a user and at a distance where the eyes of the user can focus on the one or more light markers;

detecting that the user is focusing on a first light marker of the one or more light markers;

in response to detecting that the user is focusing on the first light marker, moving the first light marker in a predetermined confirmation pattern; and triggering a virtual input event based on a determination that gaze of the user follows the first light marker through the predetermined confirmation pattern with at least a threshold level of accuracy.

* * * * *